United States Patent [19]

Springer

[11] Patent Number: 4,470,051
[45] Date of Patent: Sep. 4, 1984

[54] MULTIPLE HEAD MAGNETIC RECORDING ARRAY

[75] Inventor: Gilbert D. Springer, Sunnyvale, Calif.

[73] Assignee: Ferix Corporation, Santa Clara, Calif.

[21] Appl. No.: 381,923

[22] Filed: May 26, 1982

[51] Int. Cl.³ .............................................. G01D 15/12
[52] U.S. Cl. .................................................... 346/74.5
[58] Field of Search .............................. 346/74.2, 74.5

[56] References Cited

U.S. PATENT DOCUMENTS

| | | | |
|---|---|---|---|
| 4,072,957 | 2/1978 | Kokaji et al. | 346/74.5 |
| 4,176,362 | 11/1979 | Nelson | 346/74.5 |
| 4,380,768 | 4/1983 | Palombo et al. | 346/74.5 |

Primary Examiner—Thomas H. Tarcza
Attorney, Agent, or Firm—Kolisch, Hartwell, Dickinson & Anderson

[57] ABSTRACT

Apparatus for producing a preselected final image in a travelling magnetic image-storage medium, which image is formed of an arrangement of individual magnetic image units and line segments formed of a plurality of linearly disposed contiguous units having a predetermined center-to-center spacing. Adjacent units in adjacent line segments have substantially the same predetermined center-to-center spacing when viewed in a direction substantially normal to the direction of travel, and also have a known maximum actual center-to-center spacing. Plural magnetic writing heads, each capable of producing an image unit, are distributed to have, when viewed in a direction substantially parallel with the direction of travel of the medium, a center-to-center spacing equalling that of contiguous units in a line segment. The actual center-to-center spacing between heads capable of forming adjacent image units in a line segment exceeds the mentioned center-to-center spacings between adjacent units. A controller receives data defining a desired final image from an input channel, and develops time-coordinated signals which energize heads selectively at appropriate times as the medium travels past the heads, to effect recording on the same of image units and line segments to form the final image. The heads may be distributed in one or more side-by-side adjacent columns, each extending along a path oblique both to the direction of travel of the medium, and to the line along which a line segment may be written.

4 Claims, 5 Drawing Figures

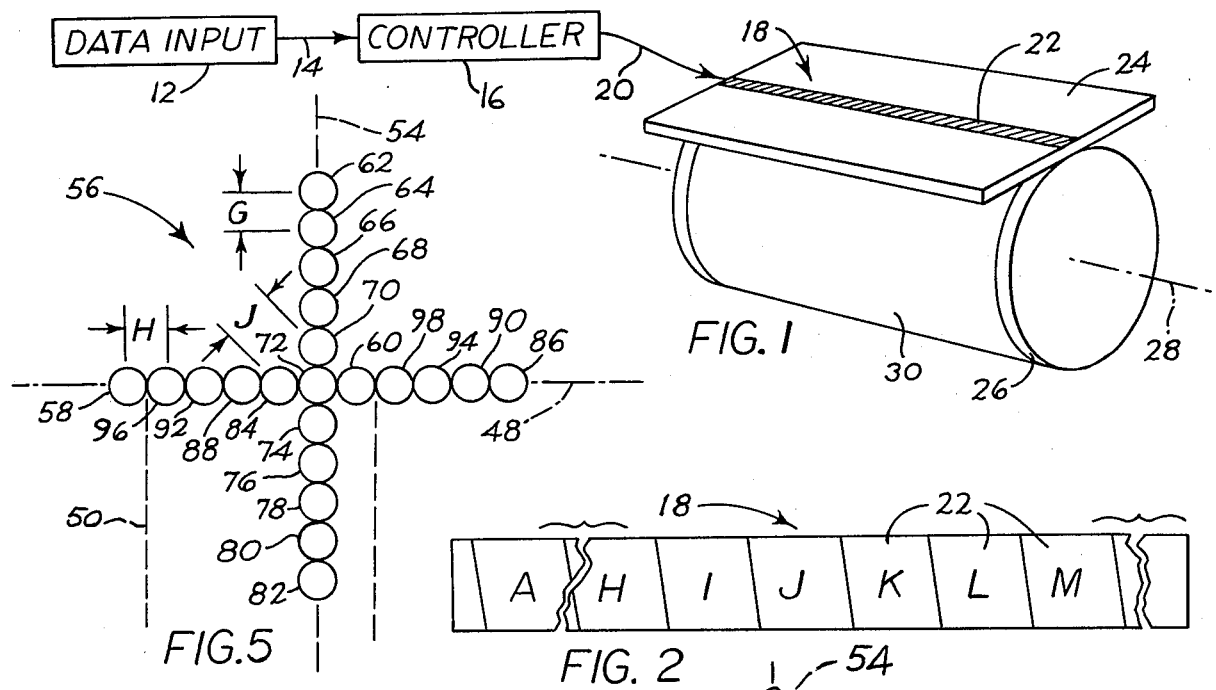
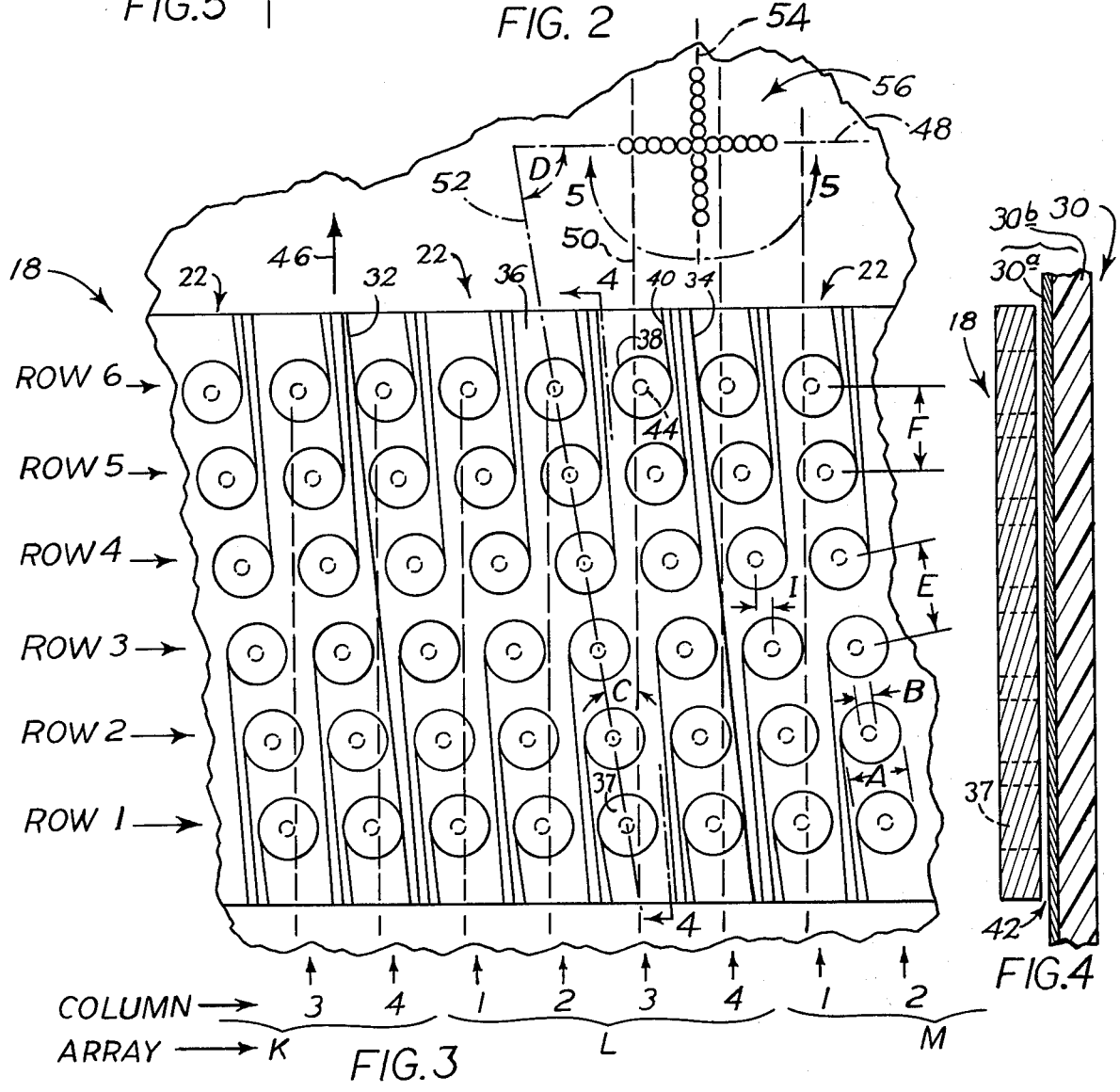

MULTIPLE HEAD MAGNETIC RECORDING ARRAY

BACKGROUND AND SUMMARY OF THE INVENTION

This invention pertains to an imaging system for producing a desired final magnetic image in a travelling magnetic image-storage medium. Specifically, it pertains to such a system in which a final image is formed of image units and line segments formed of a plurality of contiguous units by a plurality of magnetic image-writing heads.

Most conventional magnetic writing heads may be positioned close enough together to produce, simultaneously, adjacent image units on a single line in forming a final composite image. Another type of magnetic imaging system uses heads disposed for making adjacent images in alternating complementary positions on a pair of adjacent lines.

The above-mentioned capabilities are not available in an imaging system made in conformance with this invention which uses writing heads of a type disclosed in my U.S. Pat. No. 4,414,554 for "Magnetic Imaging Apparatus", issued Nov. 8, 1983. Although the type of writing head disclosed in that application produces a very clear image, the requisite physical construction precludes placement of the heads to form, simultaneously, adjacent image units. Each writing head is capable of producing a magnetic image. In order to produce a smooth-looking line segment, it is necessary that images making up a line segment be essentially contiguous. Additionally, adjacent units in adjacent line segments have a known maximum center-to-center spacing. This maximum spacing is less than the actural center-to-center spacing of writing heads capable of producing those units. Thus, it is not possible to position heads closely enough to create adjacent images simultaneously.

It is a general object of the present invention to provide a magnetic recording apparatus, having writing heads which have the limitations just described, which provides for the forming of preselected final images in a magnetic image-storage medium consisting of image units.

Specifically, a head distribution is provided whereby the heads, when viewed in a direction parallel to the direction of travel of the storage medium relative to the heads, have the same center-to-center spacing as the desired image-unit spacing in a line segment when viewed from the same direction.

These and additional objects and advantages of the present invention will be more clearly understood from a consideration of the drawings and the following detailed description of a preferred embodiment.

BRIEF DESCRIPTION OF THE DRAWINGS

FIG. 1 shows a schematic diagram of a preferred embodiment of this invention.

FIG. 2 is an enlarged fragmentary schematic diagram showing an array assembly used in the system shown in FIG. 1.

FIG. 3 is a further enlarged simplified fragmentary plan view of a portion of the array assembly shown in FIG. 2 adjacent a planar magnetic image-storage medium.

FIG. 4 is a fragmentary cross-sectional view taken along line 4—4 in FIG. 3.

FIG. 5 is an enlarged view of the portion of FIG. 3 shown by line 5—5 in FIG. 3.

DETAILED DESCRIPTION OF THE INVENTION

Referring initially to FIG. 1, an imaging system, shown generally at 10, is connectable to a data input surce 12 via input channel 14 which is adapted to convey data defining a desired final image. System 10 includes a controller 16, also referred to herein as input control means, which is connected to input channel 14. Controller 16, constructed using conventional microprocessor and/or computer techniques, is connected to an array assembly, shown generally at 18, via a multichannel communication link 20. Each channel is selectively addressable by the controller. As will be described subsequently, array assembly 18 includes a plurality of arrays, such as array 22. The assembly is mounted on a support structure 24, which is made of an appropriate material such as a rigid plastic which is both electrically and magnetically nonconductive. Disposed subjacent assembly 18 is a conventional transport system or drum 26 which is rotatable about a longitudinal axis 28. A magnetic image-storing medium 30 is wrapped around the circumference of drum 26. Assembly 18 and medium 30 have appropriate dimensions to produce and store a final image.

FIG. 2 shows, in fragmentary form, an enlarged view of assembly 18 which is shown in FIG. 1. The individual arrays 22 are designated with alphabetical letters sequentially from the left. The total number of arrays depends on the maximum width of medium 30 in which it is desired to form images.

FIG. 3 is a more detailed view, in fragmentary form, of a portion of assembly 18 and a planar representation of the associated medium 30 shown in FIG. 1. A portion of the array designated as "K," all of array "L" and a portion of array "M" are shown. The common edge between arrays "K" and "L" is shown as solid line 32. The common edge between arrays "L" and "M" is shown as line 34. Each array 22 includes a host web 36 in which are mounted a plurality of writing heads, such as heads 37 and 38, consistent with the methods disclosed in my previously mentioned application. Each head has connected to it an electrical signal line, such as line 40 connected to head 38, which is connected to a channel of communication link 20, which connection is not shown in the figure.

As shown in FIG. 4, medium 30 is of conventional construction and includes a facial expanse 30a, which is a magnetizable layer mounted on a flexible backing 30b. As discussed previously, medium 30, being disposed on drum 26, is held with a portion of facial expanse 30a in close proximity to assembly 18. The space intermediate the assembly and the medium is referred to herein as an image-producing zone designated generally at 42.

As was mentioned, the particular construction of each head and the method for producing image units in medium 30 is disclosed in the above-referenced patent. From that reference it can be seen that each head is capable of producing, when operatively excited, a well-defined circular magnetic image in expanse 30a. Each head has a generally circular form with an effective diameter of 28.2 mils in the preferred embodiment, which is shown as distance "A" in FIG. 3. The magnetic image, or more correctly, the image unit, as it is referred to herein, is also generally circular and has a diameter, shown as distance "B," equal to approximately 6.25 mils. This diameter permits positioning 160 image units contiguously in a line one inch long. In FIG. 3, the approximate relative position and size of an image unit producible by each head is shown as a dashed concentric circle within each head, such as image unit 44 on head 38.

Medium 30 travels along a predetermined transport axis shown as arrow 46, relative to assembly 18. The heads are arranged in each array 22 and the arrays are arranged together in assembly 18 to provide for creating a continuous line of contiguous image units normal to the transport axis. Such a line of contiguous image units, referred to as a line segment, is shown disposed on a dash double-dot line 48 which is normal to the transport axis. Thus, the heads are distributed to have, when viewed in a direction substantially parallel with the transport axis, an effective center-to-center spacing equaling the center-to-center spacing of image units disposed along line 48. Several dashed lines which are parallel with axis 46, such as line 50, have been added to FIG. 3 to illustrate this particular alignment of the heads. It can be seen that line 50 is just tangent at opposite relative sides to the image units producible by heads 37 and 38.

The heads are distributed in a column along a path, such as dashed dot line 52, which is oblique both to transport axis 46 and to a line along which a line segment may be written, such as line 48. The angle of line 52 relative to the transport axis is shown as angle "C". The angle between a line along which a line segment may be written (line 48) and line 52 is shown as angle "D".

The actual center-to-center spacing between adjacent heads within a column is shown as dimension "E". When viewed in a direction substantially normal to the axis, the center-to-center spacing between heads is the distance "F". In the preferred embodiment, distance "E" and "F" are approximately 38 mils and 37.5 mils, respectively.

In the embodiment shown, each column contains six heads. Four adjacent columns form an array capable of producing a continuous line segment. In the arrangement shown, the heads are disposed along rows which are essentially normal to the transport axis. This is not essential, but is done for expediency and consistency during manufacturing and to simplify operation of the controller.

Each head within each array can be identified by the column and row in which it is positioned. Designations have been added to FIG. 3 identifying rows one through six, with the lower row being row one. The columns are identified within each array beginning from the left and numbering from one through four, as shown. This provides a unique identification for each head. Head 38, identified previously, could also have been referred to under this nomenclature as "L-4/6", with the first digit indicating column, and the second digit indicating row. The heads will be referred to henceforth in this standard manner.

Referring to FIGS. 3 and 5, the center-to-center spacing between image units formed in a line essentially parallel with the transport axis, such as those along dashed line 54, have a center-to-center spacing identified as distance "G". This distance is also that which would exist between adjacent line segments and is also referred to herein as a second predetermined center-to-center spacing. It is also the same, in this embodiment, as the center-to-center spacing between image units contained within a line segment, which distance is shown as distance "H". This distance is also referred to herein as a first predetermined center-to-center spacing. It can be seen that distance "H" is also equal to distance "I" which is the center-to-center spacing between heads when viewed in a direction substantially parallel with the transport axis. As will be clear from subsequent discussion, it is preferred that the distance "F" be an integral number times the distance "G". In the present embodiment, "F" has a length six times that of "G". The distance "G", "H" and "I" in FIGS. 3 and 5 would, in this case, be equal to distance "B," which is 6.25 mils.

The distance between the centers of diagonally adjacent image units, shown as distance "J", which has a value of approximately 8.8 mils in the preferred embodiment, is the maximum distance between centers of adjacent image units in adjacent line segments.

Referring again to FIG. 1 and explaining operation of the preferred embodiment, data is received on input channel 14 from source 12 defining a magnetic image to be recorded on medium 30 for subsequent transfer onto a human readable medium, such as paper. Controller 14, in response to such data, generates time-coordinated head-energizing signals which are fed to selective ones of said heads at appropriate times as expanse $30a$ travels through zone 42. The result is a recording on expanse $30a$ of image units and line segments filling an area which is directly related, geometrically, to the desired final image.

As a specific example, the following discussion describes the steps followed during the formation of a plus symbol which is shown generally at 56 disposed on perpendicular lines 48 and 54 in FIG. 3 and also in FIG. 5. The following chart shows the sequence in which the various heads are energized in order to create the desired final image 56. The initial point in time, $t_1$, listed in the chart is the time when the position of expanse $30a$ corresponding to top image unit 62 of symbol 56 is in alignment with the centers of the heads contained in row one. Medium 30 travels through zone 42 a distance equal to distance "G" between consecutive points in time.

| Point(s) in time | Energized Head(s) (ARRAY - Column/Row) | Image Unit(s) Formed |
|---|---|---|
| $t_1$-$t_5$ | none | none |
| $t_6$ | L-3/1, L-4/1 | 58, 60 |
| $t_7$-$t_{17}$ | L-4/2 | 62-82 |
| $t_{18}$ | L-4/3, M-$\frac{1}{3}$ | 84, 86 |
| $t_{19}$-$t_{23}$ | none | none |
| $t_{24}$ | L-4/4, M-$\frac{1}{4}$ | 88, 90 |
| $t_{25}$-$t_{29}$ | none | none |
| $t_{30}$ | L-4/5, M-1/5 | 92, 94 |
| $t_{31}$-$t_{35}$ | none | none |
| $t_{36}$ | L-4/6, M-1/6 | 96, 98 |
| $t_{37}$ on | none | none |

In this preferred embodiment, the actual center-to-center spacing between heads (dimension "E", 38 mils), is greater than the maximum center-to-center spacing between adjacent image units in adjacent line segments (dimension "J," 8.8 mils, unit 70 having the same spacing relative to unit 84 as it would if it were in a line segment). It can thus be generalized that, although the geometry of each head relative to an image unit producible by such head requires that the heads be spaced apart in the arrays much further than it is desired to locate the desired adjacent image units and line segments, any desired final image may be produced.

The placement of heads in columns, such that each column of heads is capable of producing a line segment, and further the combining of several columns into a single array, provides for the creation of an ordered assembly 18 which is capable of producing a continuous line segment. The length of the segment is limited only by the number of arrays contained within the assembly. Also, by making the center-to-center spacing between heads capable of producing adjacent image units in a line segment, when viewed in a direction substantially normal to the transport axis, equal to an integral number times the spacing between image units when viewed in the same direction, all the heads in an array may be uniformly coordinated on a single time/distance base.

While the invention has been particularly shown and described with reference to the foregoing preferred embodiment, it will be understood by those skilled in the art that other changes in form and detail may be made therein without departing from the spirit and scope on the invention as defined in the following claims.

It is claimed and desired to secure by letters patent:

1. In an imaging system operatively connectable to a data input channel which is adapted to carry data defining a desired final image, with the system being of the type useable with a magnetic image-storage medium having a magnetizable facial expanse, such system having an image-producing zone through which such a medium is transportable along a known transport axis, apparatus for producing a preselected final image in such an expanse as the same is transported through such zone, which image comprises an arrangement of individual magnetic image units and image line segments formed of a plurality of linearly disposed substantially contiguous units, with adjacent units in a line segment having a first predetermined center-to-center spacing when viewed in a direction substantially parallel with the transport axis, adjacent units in adjacent line segments having a known maximum actual center-to-center spacing, and with each line segment disposed at a common angle relative to such transport axis, said apparatus comprising plural magnetic writing heads, each capable of producing an image unit, and collectively capable of producing different line segments, disposed adjacent such zone and having an actual center-to-center spacing which exceeds the predetermined and maximum spacings mentioned above, said heads being distributed to have, when viewed in a direction substantially parallel with the transport axis, an effective center-to-center spacing equaling the first predetermined spacing whereby adjacent heads, as so viewed, are spaced to produce non-overlapping adjacent image units in a line segment, and input control means operatively connected to said heads and connectable to such an input channel to receive data carried thereby, and in response to such data to generate time-coordinated head-energizing signals feedable to selective ones of said heads at appropriate times with such an expanse traveling through such a zone to effect recording on the expanse of image units and line segments filling an area which is directly related, geometrically, to the desired final image.

2. The apparatus of claim 1, wherein said heads are distributed in a column along a path oblique both to the transport axis of such a medium, and to a line along which a line segment may be written.

3. The apparatus of claim 1, wherein said heads are distributed in plural, substantially parallell side-by-side adjacent columns each extending along a path oblique both to the transport axis of such a medium, and to a line along which a line segment may be written, with adjacent heads in a column having, when viewed in a direction substantially parallel with the transport axis, a center-to-center spacing equaling the first predetermined spacing.

4. The apparatus of claim 1, wherein line segments are disposed on lines essentially normal to the transport axis and wherein adjacent units in adjacent line segments include adjacent units which are disposed on a common line parallel with the transport axis and which have a second predetermined center-to-center spacing when viewed in a direction substantially normal to the transport axis, and wherein said heads are distributed to have, when viewed in the same direction, an effective center-to-center spacing equalling an integral number times the second predetermined spacing.

* * * * *